(12) United States Patent
Osadchey

(10) Patent No.: US 6,943,334 B2
(45) Date of Patent: Sep. 13, 2005

(54) METHOD FOR DETERMINING ABSOLUTE MOTION OF AN OBJECT

(75) Inventor: Lance Osadchey, Bradford, VT (US)

(73) Assignee: Lance M. Osadchey, Bradford, VT (US)

( * ) Notice: Subject to any disclaimer, the term of this patent is extended or adjusted under 35 U.S.C. 154(b) by 0 days.

(21) Appl. No.: 10/419,557

(22) Filed: Apr. 21, 2003

(65) Prior Publication Data

US 2004/0206883 A1 Oct. 21, 2004

(51) Int. Cl.[7] .................... G01C 21/02; G01C 21/24
(52) U.S. Cl. ..................... 250/206.2; 345/158
(58) Field of Search .............. 250/206.2, 559.32; 345/158, 166; 356/4.01

(56) References Cited

U.S. PATENT DOCUMENTS 6,411,372 B1 * 6/2002 Donath et al. ............. 356/4.08
2002/0033803 A1 * 3/2002 Holzrichter et al. ........ 345/158

* cited by examiner

*Primary Examiner*—David Porta
*Assistant Examiner*—Seung C. Sohn

(57) ABSTRACT

Method and apparatus for the detection of absolute motion in a three-dimensional coordinate frame of reference, having mutually perpendicular axes X, Y and Z, by an instrument positioned in the path of a light beam or ray traveling in only one direction, existing in its own space-time frame, and moving straight ahead at the speed of light from its point of origin; and detecting the impact of the beam by the instrument, where the detection is by a charge-coupled device ("CCD") positioned in the path of the ray or beam.

7 Claims, 4 Drawing Sheets

Three Dimensional Graph of a Light Ray with X Y and Z Axes

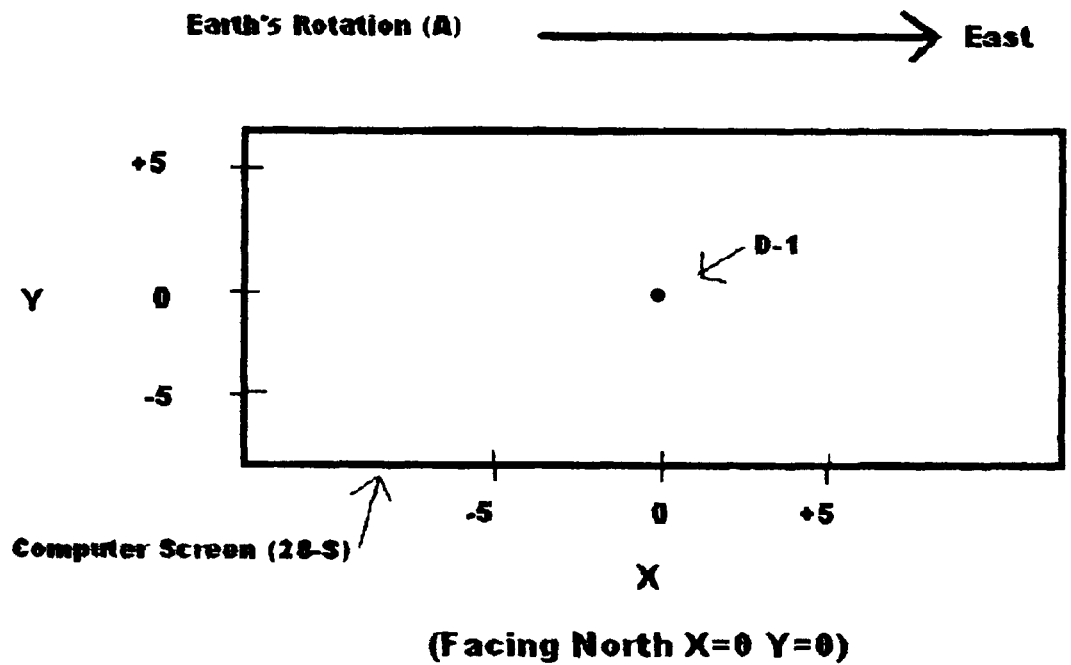
Figure 3
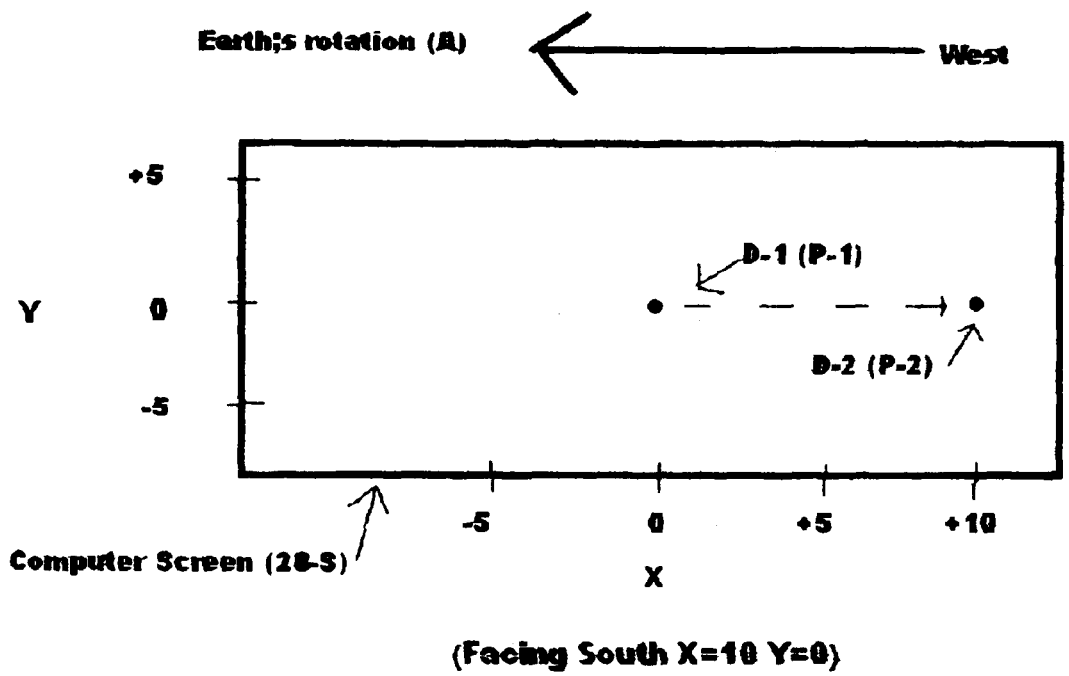
Figur 4

Laser with small 5 micron beam
frequency for best detection
Green to Yellow

Telescopic Mounting allowing Laser to be Positioned (left and right and up and down)

Orientation of two detectors at right angles to one another allowing detection of motion in three dimensions

METHOD FOR DETERMINING ABSOLUTE MOTION OF AN OBJECT

FIELD OF THE INVENTION

This invention relates to the detection of motion and, more particularly, to the detection of absolute motion between an object and the path of a light beam.

BACKGROUND OF THE INVENTION

Motion is indicated by the change of position of a body with respect to a frame of reference or a coordinate system, or relative to another body. Motion is a process that results in a body having a change of position. All motions take place on definite paths, and the nature of these paths determines the character of the motions. If all points in a body have similar, but not necessarily straight paths relative to another body, the first body has motion of translation relative to the second body.

If all points in a body have different paths relative to another body, the motion of the first body relative to the second, is a combination of translation and rotation. Rotation occurs when any line on a body changes its orientation relative to a line on another body. In a reciprocating engine, one end of a connecting rod is attached to a hinge-type joint to a piston and moves with it on a straight path relative to a cylinder block, while the other end of the rod is attached by hinge-type joint to the crankshaft and moves with it on a circular path relative to the block. Bodies connected by hinges can only rotate relative to one another. Consequently, the motion of the connecting rod relative to the piston and relative to the crankshaft is pure rotation. Relative to the block, the motion is a combination of translation and rotation, which is the most general type of plane motion in parallel planes, relative to the block.

In the real world, all motions are relative compared from one point on a body to another point on another body. If there were only one body in the universe, Newton's concept of absolute motion and absolute rest would preclude determining if it were moving or not moving. Up to now Newton's concept of absolute rest and motion have not been conceptualized.

Because of the explorations that have been made in outer space, it has become important to be able to determine absolute motion.

Accordingly, it is the principal object of this invention to provide a method and apparatus for the determination of absolute motion.

SUMMARY OF THE INVENTION

In accomplishing the foregoing and related objects, the invention provides for the detection of absolute motion in a three-dimensional coordinate frame of reference, having mutually perpendicular axes X, Y and Z, by an instrument positioned in the path of a light beam or ray traveling in only one direction, existing in its own space-time frame, and moving straight ahead at the speed of light from its point of origin; and detecting the impact of the beam by the instrument.

In accordance with one aspect of the invention, a suitable detector is a charge-coupled device ("CCD") positioned in the path of the ray or beam. The CCD device is impacted at a particular spot, which can be recorded. Other suitable detectors include high-resolution photographic film, an auto collimator or any system that has resolution suitable to detect the motion of a light beam from a laser.

In accordance with another aspect of the invention, the CCD device can be moved to another position, so that it will be stricken at another spot. The instrument can be moved to a position at a right-angle to the beam.

In accordance with still another aspect of the invention, the instrument for the detection of absolute motion is a laser that emits a single laser ray from within a tube to a charge-coupled device.

In accordance with a further aspect of the invention, the instrument is mounted on a tripod with a telescope mounting to allow precision pointing; whereby the instrument can be angled up and down as well as turned right and left. A computer has connecting cables that extend therefrom to the instrument, allowing the recording of the position of a pixel of the CCD that is struck by the laser beam. A light dot appears to indicate its position on the screen of the computer.

In accordance with a method of determining absolute motion, the steps include (a) determining the distance a ray travels from an emitting source of an instrument to a first detector therein, and calculating its motion in any direction perpendicular to the line of propagation of the ray, (b) moving the instrument from its position of first recorded impact of the light ray and determining the change of position of the impact on the detector by the light ray; and (c) positioning the instrument at a right angle to a first position in order to record motion in the right-angle coordinate; whereby the absolute motion in three directions can be determined.

The method can include the step wherein the instrument uses the earth's rotational motion for detection, and the instrument is calibrated so that a beam of light strikes a CCD detector at its center with coordinates designated X=0 Y=0, when the instrument is pointed North, for the sake of an example.

In accordance with another aspect of the method, the instrument is turned to point south, say the instrument now reads X=10 and Y=0, whereby the line up is the same between the detector and the laser emitter, so that the only difference is the orientation of the detector with the earth's motion, and a shift in pixels of the detector appears.

In accordance with yet another aspect of the method, the instrument contains a laser emitting a small 5 micron beam. The method further includes the steps of (a) adjusting a plate of the laser by screws with fine grooves to calibrate the initial laser ray to as close to the center of the detector as possible; (b) using a central mount to hold the laser securely; and (c) locking the screws in place once the desired position of the beam is achieved.

A multiplicity of detectors is employed in order to determine absolute motion in a plurality of coordinate directions without the need for having to move the position of a single detector in order to determine the absolute motion. Two or more detectors can be employed.

In a method of the invention for fabricating apparatus to detect absolute motion in a three-dimensional coordinate frame of reference, having mutually perpendicular axes X, Y and Z, the steps include (a) constructing an instrument for positioning in the path of a light beam or ray traveling in only one direction, existing in its own space-time frame, and moving straight ahead at the speed of light from its point of origin; and (b) including in the instrument means for detecting the impact of the beam. The method further includes the step of mounting means for detection as a charge-coupled device ("CCD") positioned in the path of the ray or beam.

DESCRIPTION OF THE DRAWINGS

Other aspects of the invention will become apparent after considering several illustrative embodiments taken in conjunction with the drawings in which:

FIG. 3 is a diagram of a charge-coupled detector for detection of motion.

FIG. 4 is a diagram of the charge-coupled detector of FIG. 3 used for detecting a shift of the vector of alternative motion.

DETAILED DESCRIPTION

Figure 1:
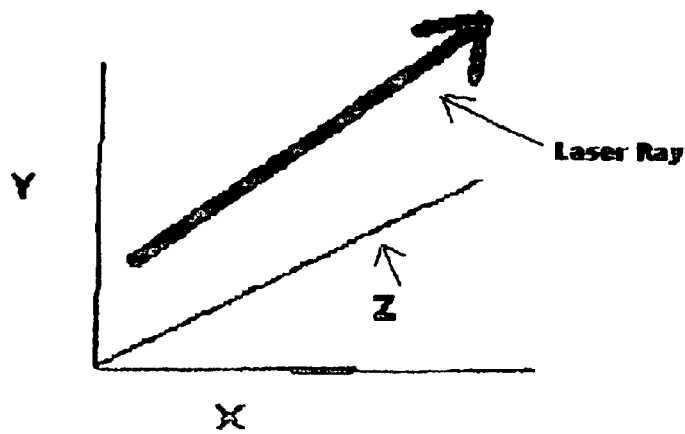
FIG. 1 is a graph in a three-dimensional coordinate frame of a reference light beam.

With reference to the drawings, FIG. 1 depicts a three-dimensional coordinate frame of reference, having mutually perpendicular axes X, Y and Z.

In this frame of reference, a light beam or ray travels only in one direction. This can be appreciated by the fact light is considered to exist in its own space-time, which moves at the speed of light. Consequentially there is no motion of a light ray or laser beam in any direction except straight ahead from its point of origin.

If a suitable detector, such as a charge-coupled device ("CCD") is put in the path of the ray or beam, the CCD detector will be impacted at a particular spot, which can be recorded. If the CCD device is moved to another position, still maintaining its original orientation to the source, the detector will be stricken at another spot.

Consider the detector at absolute rest, if the light ray strikes the detector at a certain spot, and this spot is recorded, then when the detector is put in motion at a right angle to the light ray, the ray will strike the detector in a difference point. Comparing the difference of the two points, the velocity of the detector can then be calculated. Light rays do not pick up the motion of the source of the light ray.

Another detector can be positioned at a right angle to the first detector, in order to record motion in the right-angle coordinate. Consequently, the absolute motion of the detector in three directions can be determined.

Figure 2:
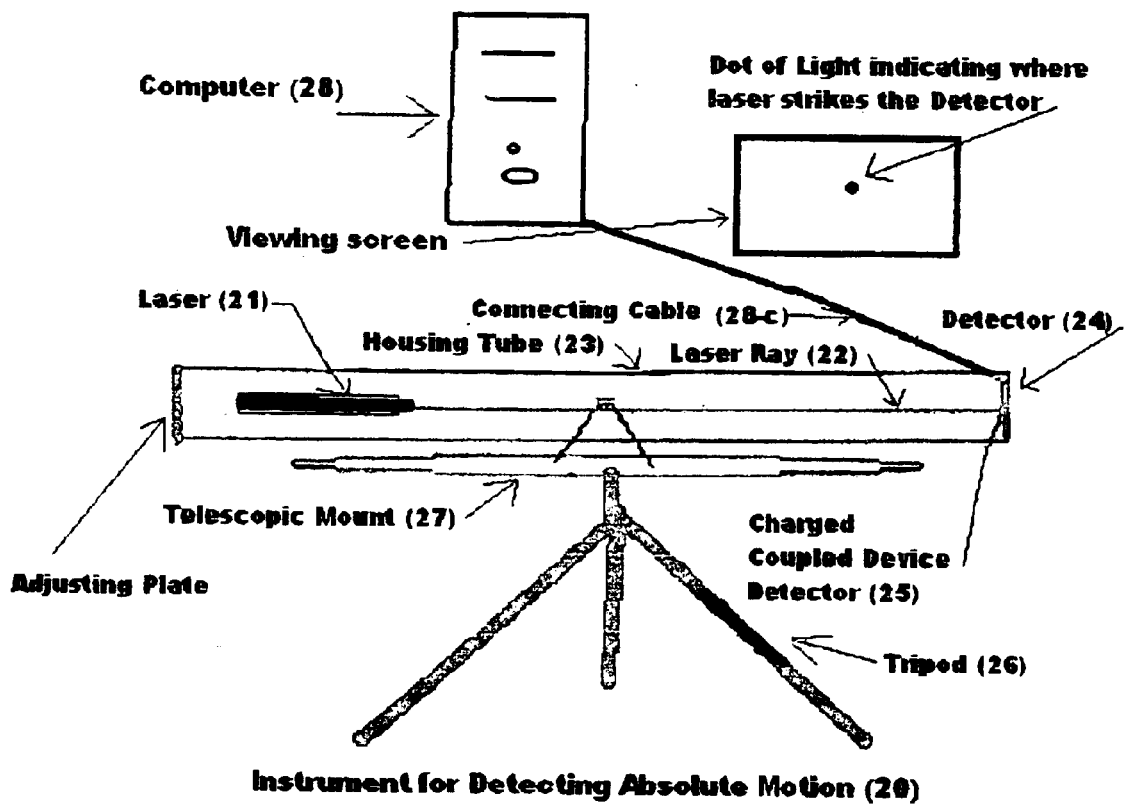
FIG. 2 is a diagram of a schematic device for detecting motion.

As indicated in FIG. 2, a device schematic of an instrument 20 for the detection of absolute motion employs a laser 21 that emits a single laser ray 22. The laser 21 is positioned in a tube 23 and emits the ray 22 for impacting a detector 24 inside the tube 23. A suitable detector 24 takes the form of a charge-coupled device (CCD) 25.

The instrument 20 is mounted on a tripod 26 with telescope mounting 27 to allow precision pointing of the instrument 20. As a result, the instrument 20 can be angled up and down as well as turned right and left.

A computer 28 has connecting cables 28-C that extend from the computer 28 to the CCD 25, allowing the recording of the position of the pixel P-1 of the CCD that is truck by the laser beam 22.

As a result, a light dot D-1 appears to indicate its position on the computer screen 28-S. It is to be noted in FIG. 3, that the rotation of the earth is symbolized by the arrow A showing the direction of rotation from west to east, facing north at coordinates X=0, Y–0.

Using the Earth's rotational motion as an example for detection, the instrument 20 is calibrated so that the beam of light strikes the CCD 25 at its center with coordinates designated X=0Y=0.

With the instrument 20 now turned to point South, X=10 Y=0, as represented in FIG. 4, since the line up is the same between the detector 24 and the laser emitter 21, and the only difference is the orientation of the detector 24 with the Earth's motion, a shift in the pixels P-1, P-2 of the detector 24, is noted. The dot D-1 on the left represents the original dot position and the dot D-2 on the right is the visible dot, which has shifted.

Figure 5:
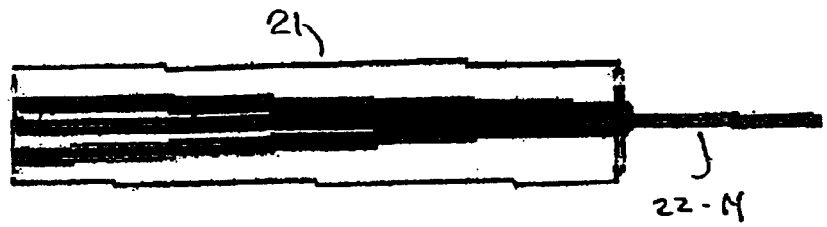
FIG. 5 is a diagram of a laser beam illustratively having a yellow-green color and being 5 microns in diameter.

As shown in FIG. 5, for suitable detection, the laser 21 emits a small 5 micron beam 22-M which has a color, depending on the laser used.

Figure 6:
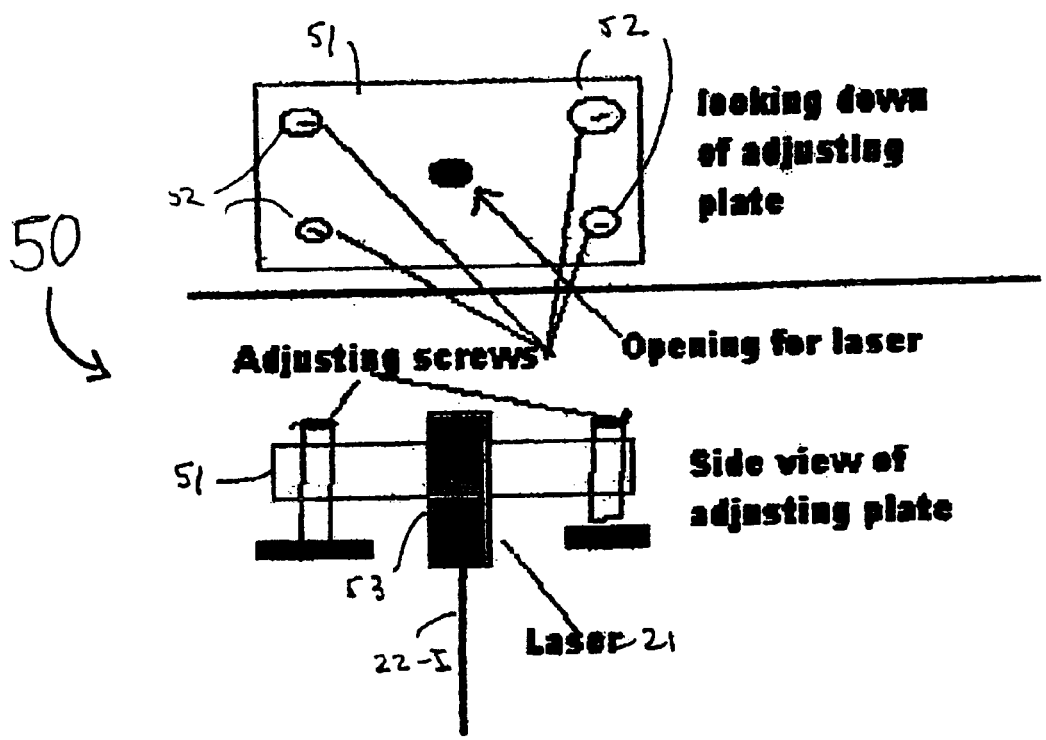
FIG. 6 is a diagram of an assemblage for laser adjusting plates in accordance with the invention.
Figure 7:
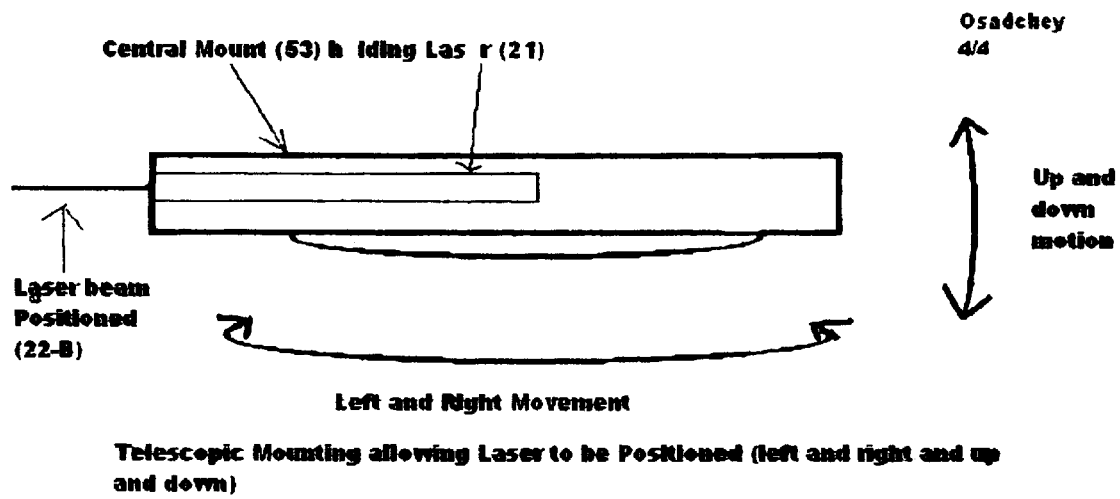
FIG. 7 is a diagram of a telescope mounting for a laser to be angled in multiple directions.
Figure 8:
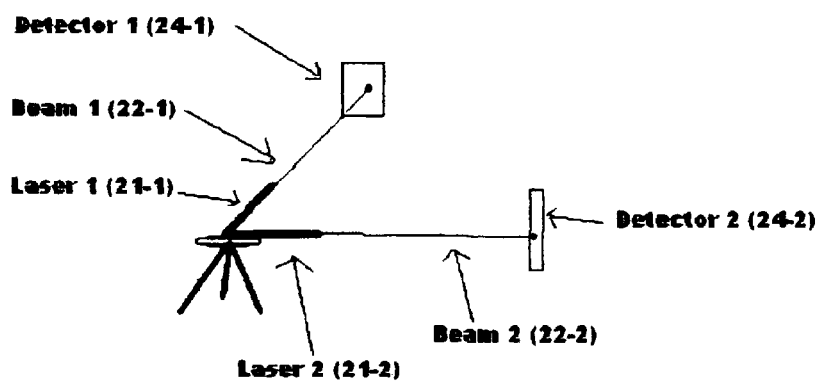
FIG. 8 is a diagram showing the orientation of two detectors for the detection of motion in three directions.

In the assembly diagram 50 of FIG. 6, for the laser adjusting plate 51, 4 screws 52 with fine grooves are used to calibrate the initial laser ray 22-I to as close to the center of the CCD 25 as possible. A central mount 53 holds the laser 21 securely. The screws 52 are lockable once the desired position of the beam 22-B is achieved.

The above depiction employs only one laser 21 and detector 25 for simplicity. A final instrument can contain a multiplicity of detectors, such as two or more, arranged in all directions to reveal a composite motion vector without the need to turn the single laser employed in a single arm procedure.

It will be understood that the foregoing detailed description is illustrative only and that modifications and adaptations of the invention may be made by those of ordinary skill in the art without departing from the spirit and scope of the invention as defined in the appended claims.

What is claimed:

1. A method of determining absolute motion comprising the acts of:

orientating an instrument in a first orientation;

determining a distance a ray travels from an emitting source of said instrument to a first detector disposed within said instrument, calculating a first position of said ray on said first detector and designating said first position with coordinates X=0 Y=0;

orientating said instrument from said first orientation to at least a second orientation, said at least a second orientation being at approximately a right angle with respect to said first orientation;

determining at least a second position of said ray on said first detector;

calculating a shift between said first and said at least a second position of said ray; and determining the absolute motion in three directions using the earth's rotational motion.

2. The method as defined in claim 1, wherein said instrument is oriented in said at least a second orientation such that said first detector reads X does not equal to 0 and Y=0.

3. The method as defined in claim 2, wherein said emitting source includes a laser emitting an approximately 5 micron beam.

4. The method as defined in claim 1, further including the acts of:

adjusting a plate secured to said emitting source using screws with fine grooves to align said first position of said ray such that said fist position is disposed substantially at a center of said detector;

securing said emitting source using a central mount; and locking said screws in place once said ray is disposed in said first position.

5. The method as defined in claim 4, wherein a multiplicity of detectors is employed in order to determine absolute motion in a plurality of coordinate directions without having to move the orientation of any detector in order to determine said absolute motion.

6. The method as defined in claim 5, wherein said multiplicity of detectors includes a only two detectors.

7. The method as defined in claim 5, wherein said multiplicity of detectors includes at least three detectors.

* * * * *